United States Patent
Nagasaka

(10) Patent No.: US 8,111,433 B2
(45) Date of Patent: Feb. 7, 2012

(54) IMAGE READING DEVICE CAPABLY SCANNING AN IMAGE FORMED ON A DOCUMENT IN CONSIDERATION OF DETERIORATION OF THE REFERENCE MEMBER

(75) Inventor: Hideaki Nagasaka, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 986 days.

(21) Appl. No.: 11/926,773

(22) Filed: Oct. 29, 2007

(65) Prior Publication Data

US 2008/0112017 A1 May 15, 2008

(30) Foreign Application Priority Data

Nov. 13, 2006 (JP) .................................. 2006-306416

(51) Int. Cl.
*H04N 1/40* (2006.01)
*G06K 7/00* (2006.01)

(52) U.S. Cl. ........ 358/461; 358/474; 358/475; 358/486; 358/487; 358/491; 358/493; 358/494; 358/496; 358/497; 358/505; 382/312; 382/313; 382/315; 382/317; 382/149; 382/141; 382/154; 382/169; 382/175; 382/251; 382/266; 382/274; 382/318; 250/208.1; 250/208.2; 250/208.3; 250/208.4; 250/208.6; 250/216

(58) Field of Classification Search .................. 358/474, 358/475, 461, 493, 494, 486, 487, 491, 496, 358/497, 505; 382/312, 313, 315, 317; 250/208.1, 250/208.2, 208.3, 208.4, 208.5, 208.6, 216
See application file for complete search history.

(56) References Cited

U.S. PATENT DOCUMENTS

| 5,381,059 A * | 1/1995 | Douglas .......................... 326/58 |
| 6,072,912 A | 6/2000 | Orito |
| 7,102,787 B2 * | 9/2006 | Tamamura ................... 358/3.01 |
| 7,423,784 B2 * | 9/2008 | Tanabe et al. ................. 358/461 |
| 7,619,785 B2 * | 11/2009 | Sodeura et al. ............... 358/474 |
| 2006/0164669 A1 * | 7/2006 | Itou .............................. 358/1.13 |

FOREIGN PATENT DOCUMENTS

| JP | 5-14712 | 1/1993 |
| JP | 9-9063 | 1/1997 |
| JP | 11-75061 | 3/1999 |
| JP | 11-112800 | 4/1999 |

* cited by examiner

Primary Examiner — Steven Kau
(74) Attorney, Agent, or Firm — Scully, Scott, Murphy & Presser, P.C.

(57) ABSTRACT

An image reading device includes a reference member, a reading unit, a first reference value setting unit, a detecting unit, a second reference value setting unit, a determining unit, and a pixel value setting unit. The reading unit obtains image data and reference data. The first reference value setting unit sets a first reference value based on the reference data. The detecting unit detects a usage state of the reading unit. The second reference value setting unit sets a second reference value in accordance with the usage state. If the determining unit determines that the first reference value is in a predetermined condition, the pixel value setting unit sets a pixel value based on the image data and the first reference value; otherwise, the pixel value setting unit sets the pixel value based on the image data and the second reference value.

8 Claims, 6 Drawing Sheets

| WHITE REFERENCE THRESHOLD VALUE | 35,000 |
|---|---|
| BLACK REFERENCE THRESHOLD VALUE | 500 |

| PAGE COUNTER | WHITE REFERENCE VALUE | BLACK REFERENCE VALUE |
|---|---|---|
| 0~5,000 | 65472 | 0 |
| 5,001~10,000 | 62198 | 0 |
| 10,001~20,000 | 58924 | 0 |
| 20,001~30,000 | 55651 | 0 |
| 30,001~40,000 | 52377 | 0 |
| 40,001~50,000 | 49104 | 0 |
| 50,001~ | 45830 | 0 |

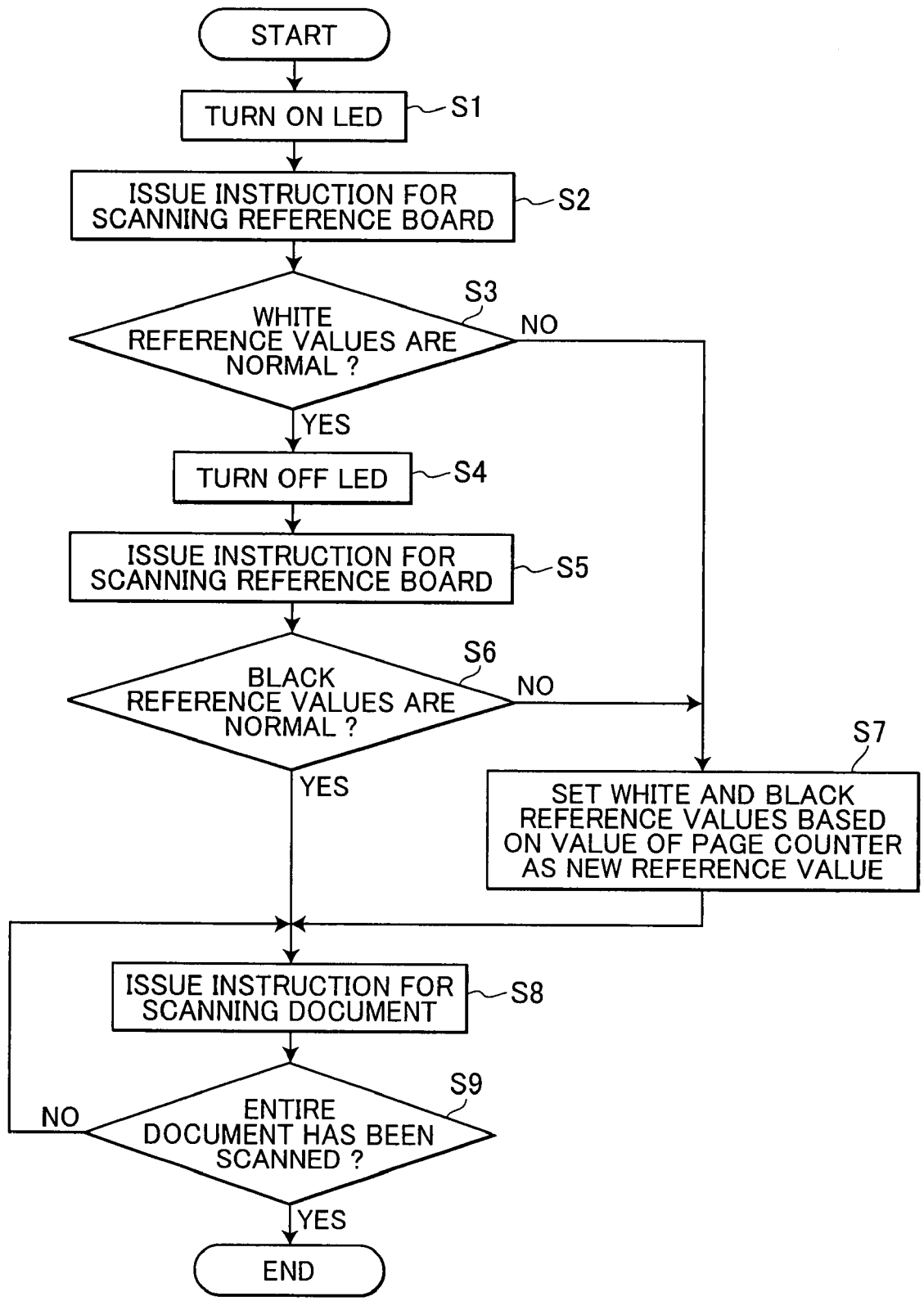

IMAGE READING DEVICE CAPABLY SCANNING AN IMAGE FORMED ON A DOCUMENT IN CONSIDERATION OF DETERIORATION OF THE REFERENCE MEMBER

CROSS REFERENCE TO RELATED APPLICATION

This application claims priority from Japanese Patent Application No. 2006-306416 filed Nov. 13, 2006. The entire content of the priority application is incorporated herein by reference.

TECHNICAL FIELD

The present invention relates to an image reading device and, more particularly, to an image reading device capable of accurately reading an image formed on a document even when the image has become abnormal due to influence of outside light.

BACKGROUND

There is known an image reading device that irradiates light on a document from a light source and reads reflection light reflected off the document using a plurality of light-receiving sensor such as a CCD to form an image. Japanese Patent Application Publication No. 11-112800 discloses an image reading device configured to scan a reference member for correcting light-receiving sensitivity of a light-receiving sensor before scanning a document, and to set scanned values as reference values for document reading operation. Then, if the reference values include abnormal value, the abnormal value is rewritten based on data adjacent to the abnormal value.

SUMMARY

However, in the image reading device disclosed in Japanese Patent Application Publication No. 11-112800, the abnormal value is rewritten based on data adjacent to the abnormal value. Therefore, when the reference member is affected by outside light, values (reference values) that are scanned from the entire reference member become abnormal. Since the reference values are abnormal, an image formed on a document cannot be scanned accurately.

In general, the reference member having physical properties in which scanned value is hard to change with time is used. However, scanned value is not always the same but is deteriorated with time. Further, the performance of light sources and light-receiving sensors that scans an image formed on a document is subject to deterioration with time. Therefore, an image formed on a document cannot be reliably scanned because of deterioration of the reference member, light source, and light-receiving sensor with time.

In view of the foregoing, it is an object of the present invention to provide an image reading device capable of accurately scanning an image formed on a document in consideration of deterioration of the reference member even if there is influence of outside light.

In order to attain the above and other objects, the invention provides an image reading device including a reference member, a reading unit, a first reference value setting unit, a detecting unit, a second reference value setting unit, a determining unit, and a pixel value setting unit. The reading unit scans an image on a document to obtain image data and scans the reference member to obtain reference data. The first reference value setting unit sets a first reference value based on the reference data. The detecting unit detects a usage state of the reading unit. The second reference value setting unit sets a second reference value in accordance with the usage state of the reading unit. The determining unit determines whether or not the first reference value is in a predetermined condition. The pixel value setting unit sets a pixel value. The pixel value setting unit sets the pixel value based on the image data and on the first reference value, if the determining unit determines that the first reference value is in the predetermined condition; and the pixel value setting unit sets the pixel value based on the image data and on the second reference value, if the determining unit determines that the first reference value is not in the predetermined condition.

According to another aspect, the invention also provides an image reading method for an image reading device including a reference member, and a reading unit that scans an image on a document to obtain image data and that scans the reference member to obtain reference data. The image reading method includes:

setting a first reference value based on the reference data;

detecting a usage state of the reading unit;

setting a second reference value in accordance with the usage state of the reading unit;

determining whether or not the first reference value is in a predetermined condition, and setting a pixel value based on the image data and on the first reference value, if the first reference value is in the predetermined condition; and setting a pixel value based on the image data and on the second reference value, if the first reference value is not in the predetermined condition.

BRIEF DESCRIPTION OF THE DRAWINGS

FIG. 5 is an example of threshold values stored in a threshold value memory in FIG. 4;

FIG. 6 is an example of reference values stored in a time dependent reference value memory in FIG. 4; and FIG. 7 is a flowchart illustrating steps in a process executed by the MFP when a document is scanned.

DETAILED DESCRIPTION

Figure 1:
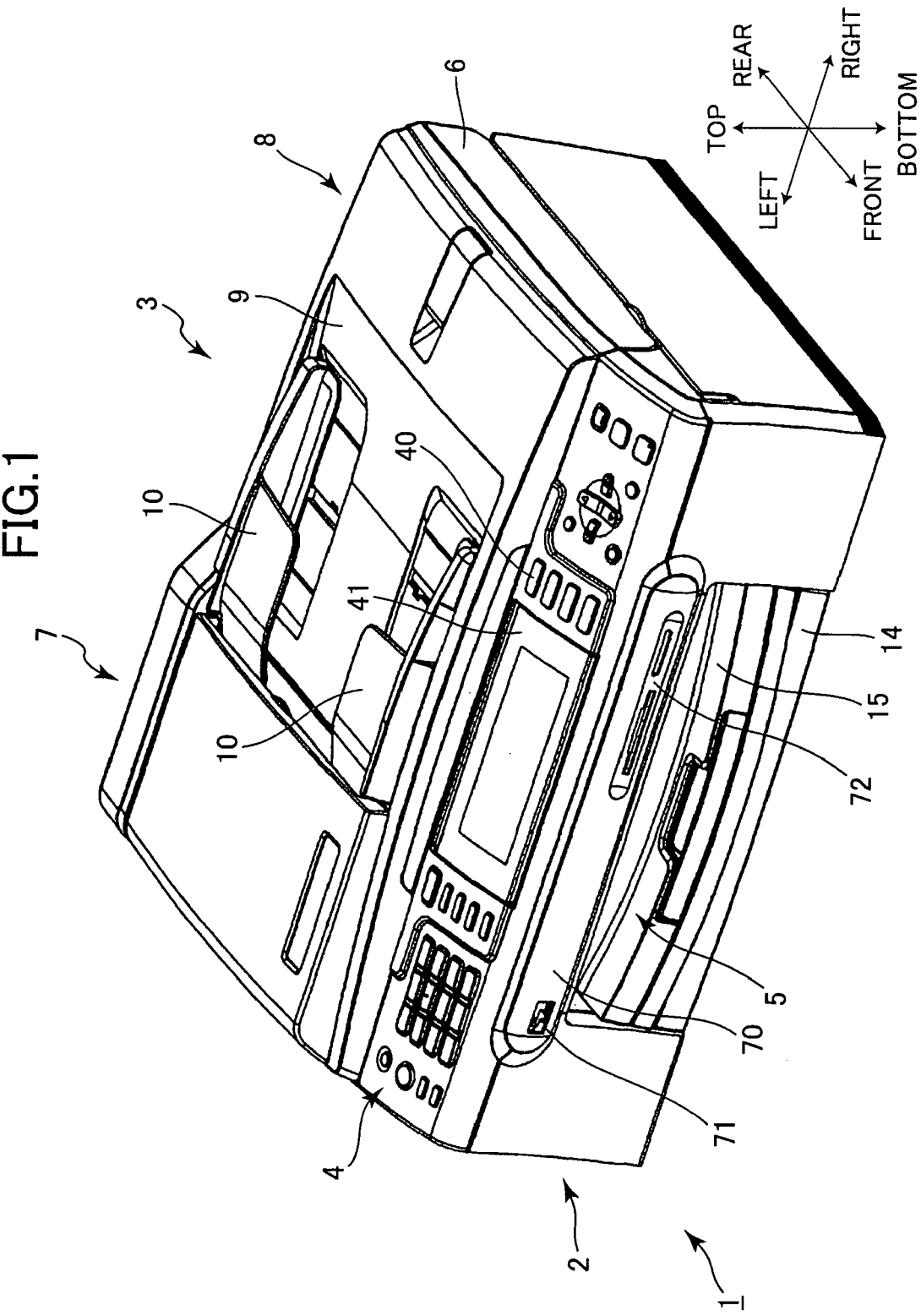
FIG. 1 is a perspective view showing an outer structure of an MFP provided with an image reading device according to an embodiment of the present invention.

An embodiment of the present invention will be described with reference to the accompanying drawings. FIG. 1 is a perspective view showing an outer structure of an MFP 1 (Multi Function Peripheral or Multi Function Printer) provided with an image reading device according to the present invention. The MFP 1 has various functions such as a facsimile function, a printer function, a scanner function, and copy function.

As shown in FIG. 1, the MFP 1 mainly includes a printer 2 disposed at the lower section of the MFP 1, a scanner 3 disposed at the upper section of the MFP 1, and an operation panel 4 disposed on the front side of the scanner 3. The printer 2 is so-called an ink-jet type image recording device (ink-jet printer) configured to selectively eject ink droplets based on image data scanned by the scanner 3 or externally input image data to form an image on a recording sheet.

An opening 5 is formed on the front side of the printer 2. A sheet supply tray 14 and a sheet discharge tray 15 are entirely housed in the opening 5. The sheet supply 14 and sheet discharge tray 15 are arranged in a two-tiered structure, with the sheet discharge tray 15 on the upper tier and sheet supply tray 14 on the lower tier. The sheet supply tray 14 is a rectangular case. The rectangular recording sheets, each of which has a rectangular shape, are stacked on the tray 14 in such a manner that the longitudinal direction of the rectangular recording sheets is parallel to the front-to-rear direction.

Inside the printer 2, a sheet feeding path curves from the back of the sheet supply tray 14 to the front side and is connected to the sheet discharge tray 15. A recording sheet set in the sheet supply tray 14 is supplied to the sheet feeding path in a state that the short side of the recording sheet is a leading edge, then turned around, and guided to an image recording position provided in the sheet feeding path. Then, an image is recorded onto the recording sheet at the image recording position by the printer 2. After recording the image, the recording sheet is discharged to the sheet discharge tray 15.

The operation panel 4 is provided to operate the printer 2 and scanner 3 and includes various operation keys 40 such as a document scanning button and an LCD 41. A user can use the operation panel 4 to input a desired instruction. When a predetermined instruction is input to the MFP 1, a CPU 21 (see FIG. 4) starts controlling the operation of the MFP 1 based on the input information. The MFP 1 is configured to operate based on not only the instruction input from the operation panel 4 but also an instruction transmitted through a printer driver or scanner driver from a computer connected thereto.

A connection panel 70 is provided above the opening 5 of the printer 2. A USB terminal 71 is formed at the left side portion of the connection panel 70. The USB terminal 71 is a connector terminal for connecting an external device and MFP 1 in a communicable manner through a USB cable. A slot portion 72 is located at the right side of the connection panel 70. A plurality of card slots to which a memory card can be attached are formed in the slot portion 72. Image data scanned by the scanner 3 can be stored in a memory card or image data stored in the memory card can be printed out by the printer 2.

The scanner 3 includes a document reading base 6 serving as a Flat Bed Scanner (FBS) and a document cover 8 provided with an Auto Document Feeder (ADF) 7. The document cover a is attached to the document reading base 6 through hinges 11 (see FIG. 2), so as to be capable of opening and closing on the document reading base 6 about the hinges 11. The ADF 7 is configured to feed a document from a document tray 9 to a document discharge tray 10 through a document feeding path.

Figure 2:
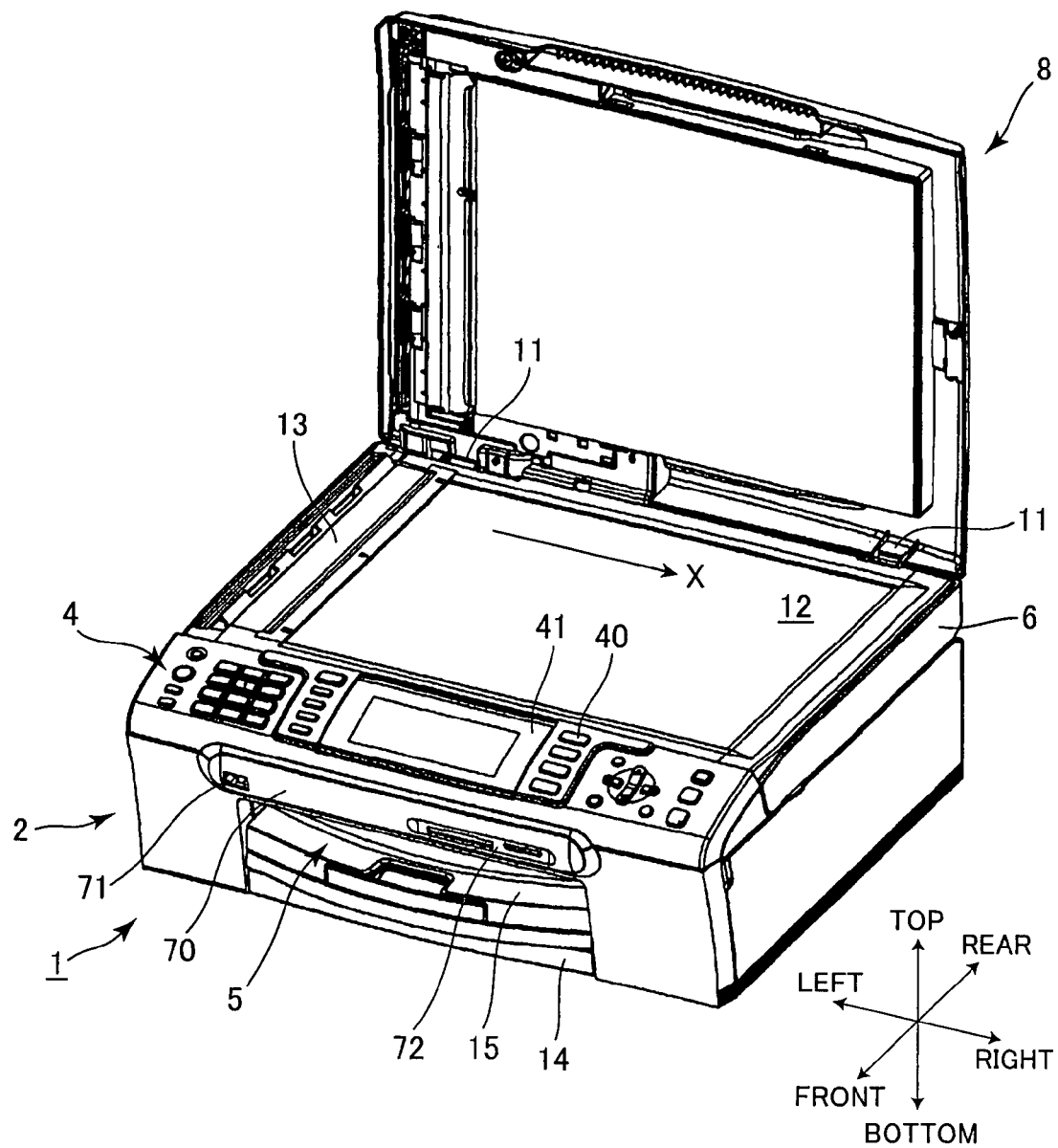
FIG. 2 is a perspective view showing the outer structure of the MFP in FIG. 1 in a state where a document cover is opened.

As shown in FIG. 2, the top surface of the document reading base 6 is formed with an opening, and a platen glass 12 is fitted in the opening. An image reading unit 3a (see FIG. 3) is accommodated in the document reading base 6 and is capable of reciprocating in the main scanning direction (X direction). The detail of the image reading unit 3a will be described later.

When the scanner 3 is used as the FBS, a user opens the document cover 8, places a document on the platen glass 12, and closes the document cover 8 to fix the document. Upon input of a scanning operation start instruction, the image reading unit 3a scans the document along the rear surface of the platen glass 12 in the main scanning direction (X direction), whereby an image on the document is scanned. In general, the document scanning operation is performed with the document cover a closed. However, when a page of a thick book is scanned, the document cover 8 cannot be closed. If the image reading unit 3a (see FIG. 3) is affected by outside light in the case where the document scanning operation is performed with the document cover 8 opened, a reference value for scanning the document cannot accurately be acquired in some cases. The detail of the reference value will be described later.

When the document is automatically fed by the ADF 7 for the scanning operation, the document passes through a reading surface 13 on the document reading base 6 in the document feeding process of the ADF 7, and an image on the document is scanned by the image reading unit 3a that is moved on the lower portion of the reading surface 13. The scanning operation using the ADF 7 is performed with the document cover 8 closed relative to the document reading base 6.

Figure 3:
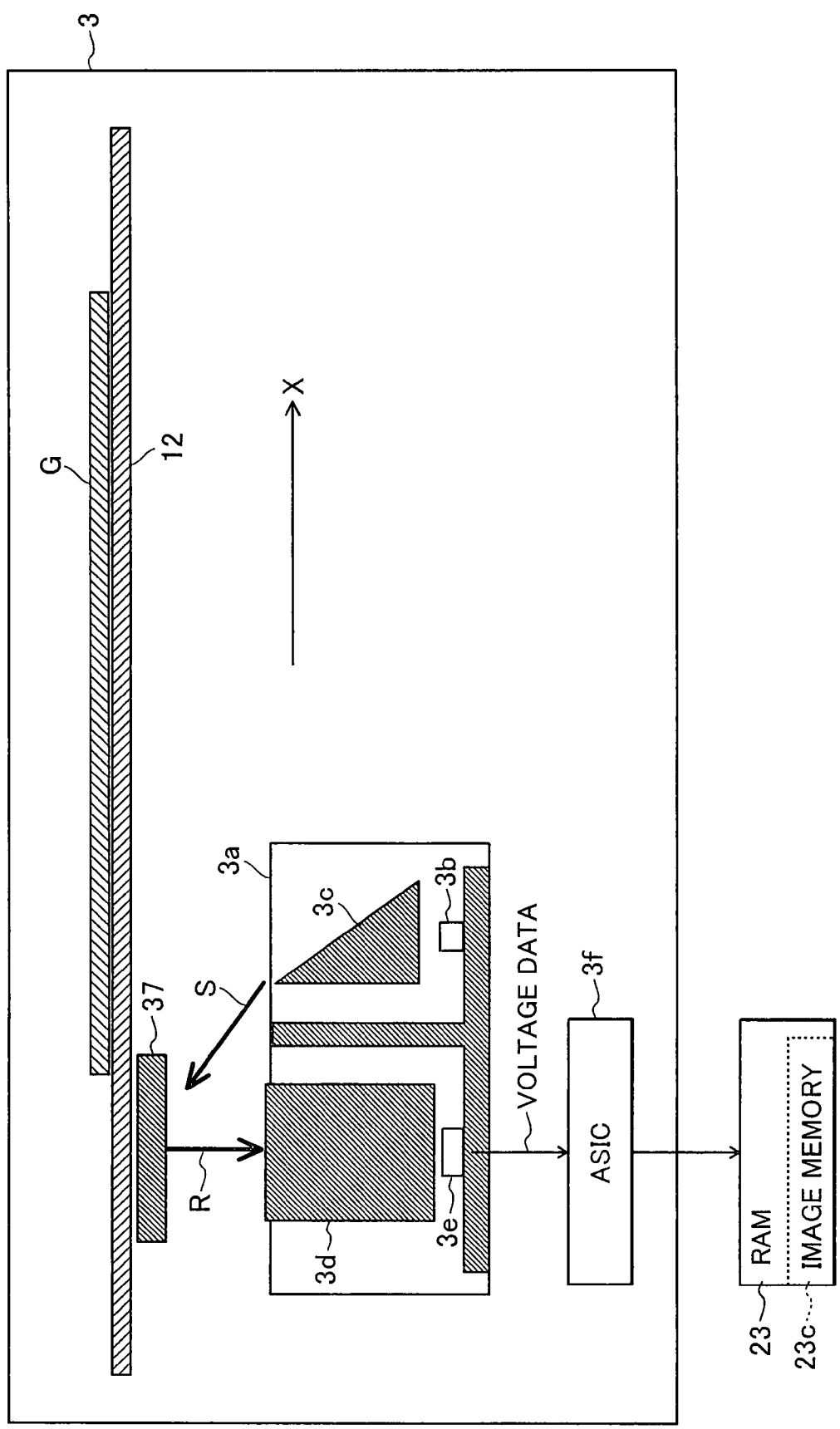
FIG. 3 is a schematic cross-sectional view showing a structure of the scanner according to the embodiment.

Next, the structure and operation of the scanner 3 will be described with reference to FIG. 3. FIG. 3 is a schematic cross-sectional view showing a structure of the scanner 3 provided in the MFP 1 as viewed from the front side. As shown in FIG. 3, the platen glass 12 is fitted in the opening portion of the document reading base 6. The image reading unit 3a is provided on the lower portion of the platen glass 12.

The image reading unit 3a mainly includes a light source (LED) 3b, a light guide 3c, a light guide 3d, and a CCD 3e. The light source (LED) 3b emits a light. The light guide 3c focuses a light onto the scanned portion of a document. The light guide 3d focuses a reflection light from the document onto the CCD 3e. The CCD 3e outputs a voltage in accordance with the strength of a receiving light. The image reading unit 3a is capable of reciprocating in the main scanning direction (X direction). A white reference board 37 is disposed under the platen glass 12 and above the light guide 3d. The white reference board 37 is a thin-plate member having at least one side colored white. The white colored side of the white reference board 37 faces downward.

Upon depression of the document scanning button which is one of the operation keys 40 after a document G is placed on the platen glass 12, scanning operation for the document G is started. Before the document G is scanned, the white reference board 37 is scanned by the image reading unit 3a. More specifically, first, the LED 3b is turned on to emit a light. The direction of the light is changed by the light guide 3c, whereby the light is irradiated onto the white reference board 37 as an irradiation light S. A part of the light reflected on the surface of the white reference board 37 is directed to the CCD 3e as a reflection light R. The reflection light R is focused by the light guide 3d onto the CCD 3e and a voltage value corresponding to the strength of the focused light is output from the CCD 3e. The CCD 3e includes a plurality of light-receiving elements sequentially aligned. One element corresponds to one pixel of one line of image data. Next, the LED 3b is turned off and, then, the white reference board 37 is scanned in the same manner as in the case where the LED 3b is turned on and a voltage value is output from the CCD 3e.

After scanning the white reference board 37 both in the case where the LED 3b is turned on and off, the scanning range (white reference value, black reference value) of the document G is set. When the image reading unit 3a has been fed to the document scanning start position, scanning operation for the document is started. As in the case of the scanning operation for the white reference board 37, the image reading unit 3a irradiates the document G with the irradiation light S. The reflection light R reflected on the surface of the document G is focused onto the CCD 3e and a voltage value corresponding to the strength of the focused light is output from the CCD 3e, which is then input to an ASIC 3f. Every time the document G is scanned by one line, the image reading unit 3a is fed in the main scanning direction (X direction) by one line. By repeating the reading operation and feeding operation, the entire area of the document G is scanned.

The ASIC 3f is an integrated circuit that converts voltage values input from the respective elements of the CCD 3e into 16-bit numeric data and perform various data corrections for the numeric data to output the corrected data as image data. That is, one reference value and one pixel value corresponding to one element of the CCD 3e is composed of 16-bit numeric value. The image data output from the ASIC 3f is stored into an image memory 23c of an RAM 23 (see FIG. 4) through a bus line 25, whereby the image on the document G is stored as image data.

Figure 4:
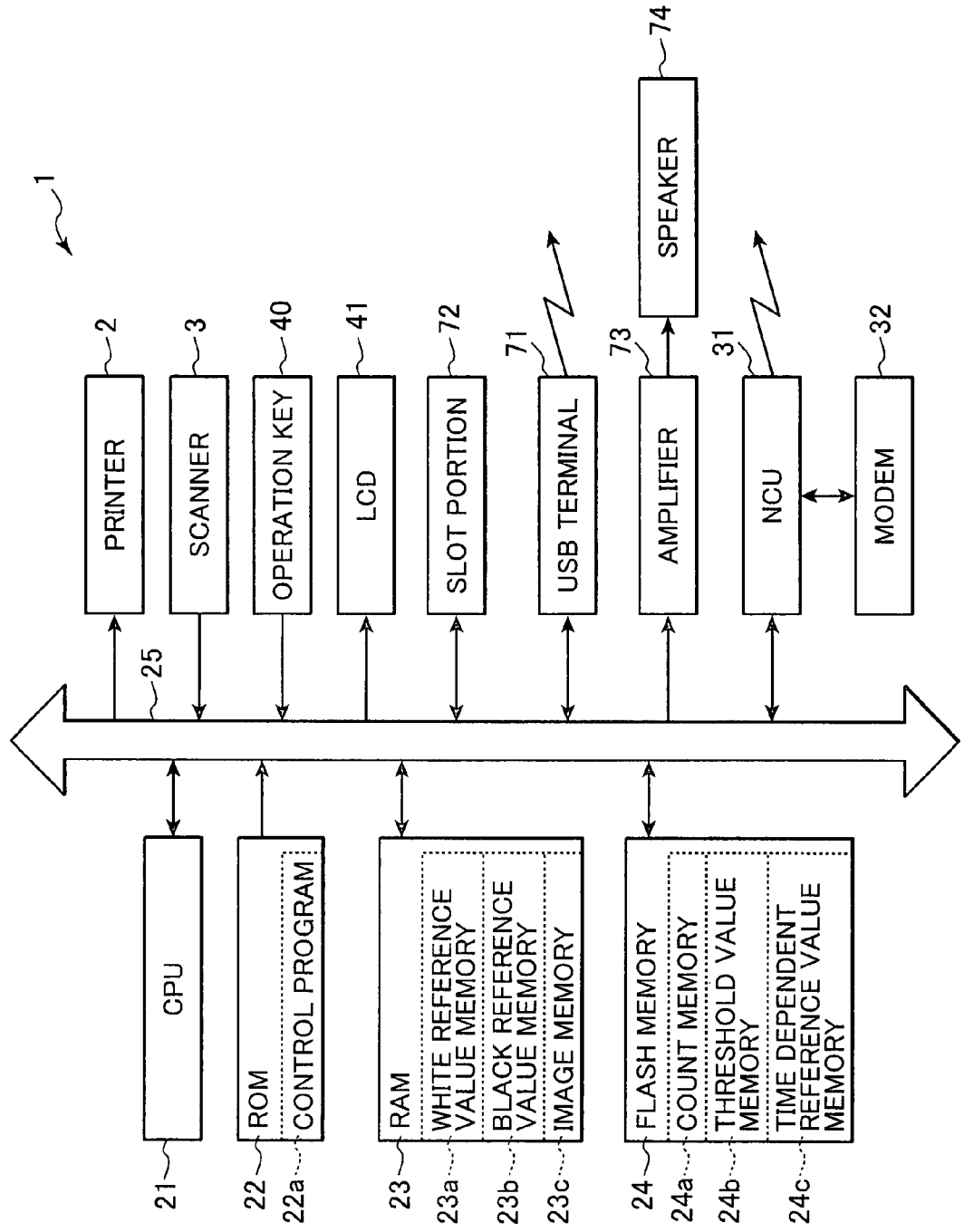
FIG. 4 is a block diagram showing an electrical configuration of the MFP according to the embodiment.

FIG. 4 is a block diagram showing an electrical configuration of the MFP 1. The MFP 1 mainly includes the printer 2, the scanner 3, a CPU 21, a ROM 22, a RAM 23, a flash memory 24, a network control unit (NCU) 31, a modem 32, the operation keys 40, the LCD 41, the USB terminal 71, the slot portion 72, an amplifier 73, and a speaker 74, all of which are connected to each other through a bus line 25.

The CPU 21 controls the abovementioned components according to fixed values or program stored in the ROM 22, RAM 23, or flash memory 24, functions provided in the MFP 1, and various signals transmitted/received through the NCU 31. The ROM 22 is an unrewritable memory for storing various control program 22a executed in the MFP 1. The RAM 23 is a rewritable memory for storing various data. The RAM 23 includes various memories such as a white reference value memory 23a, a black reference value memory 23b, and an image memory 23c.

The white reference memory 23a stores a white reference value used for a correction of a difference between respective elements of the CCD 3e After the conversion of a voltage value output from the CCD 3e into a numeric value, the correction is performed on the numeric value. The value of the white reference value memory 23a is updated when a facsimile function, scanner function, or copy function is executed.

Similarly, the black reference memory 23b stores a black reference value used for correction of a difference between respective elements of the CCD 3e. After the conversion of a voltage value output from the CCD 3e into a numeric value, the correction is performed on the numeric value. The value of the black reference value memory 23b is updated when a facsimile function, scanner function, or copy function is executed. The image memory 23c stores image data of a document scanned by the scanner 3.

The flash memory 24 is a rewritable nonvolatile memory. Data stored in the flash memory 24 is retained even after the power-off time of the MFP 1. The flash memory 24 includes a count memory 24a, and a threshold value memory 24b, a time dependent reference value memory 24c. The count memory 24a is a page counter in which the number of sheets, which is used in the printer 2 since the MFP 1 was produced, is stored. Every time one sheet is used in the printing operation, 1 is added to the counter value in the count memory 24a.

The threshold value memory 24b stores threshold values. The threshold values are used for determining whether the white reference value stored in the white reference value memory 23a or black reference value stored in the black reference value memory 23b is abnormal or not. The time dependent reference value memory 24c stores white and black reference values that are used as alternative values in the case where the white or black reference value, set before the scanning operation for a document, in the white or black reference value memory 23a, 23b includes an abnormal value. In order to adapt to a reference value which is changed with temporal change, a plurality of white and black reference values corresponding to the number of sheets that have been used in the printer 2 are stored as alternative values in the time dependent reference value memory 24c.

The NCU 31 transmits a dial signal to a telephone network (not shown) and responds to a calling signal from the telephone network. The modem 32 modulates/demodulates image data through the NCU 31 and transmits resultant data to another facsimile machine (not shown), as well as transmits and receives various procedure signals for transmission control. The USE terminal 71 is a known circuit for transmitting and receiving data to/from a computer through a USB cable (not shown). The amplifier 73 drives the speaker 74 connected thereto to output a calling sound.

Next, the details of the white reference value memory 23a and black reference value memory 23b will be described. The scanner 3 scans the white reference board 37 before scanning a target document to set white and black reference values. Since voltage values to be output vary even if the same light amount is input to respective elements of the CCD 3e, when the voltage values are simply converted into numeric data for replacement of the voltage values by pixel values, unevenness occurs in an image formed from the pixel value. In order to cope with this, white and black reference values are stored for each element of the CCD 3e. Based on the white and black reference values corresponding to respective elements of the CCD 3e, the output numeric values are replaced by pixel values. Thus, pixel values having a well-controlled density can be acquired without effects of differences among the light-receiving sensitivities of the elements. Therefore, the occurrence of image unevenness can be prevented and an image on a target document can be scanned accurately.

The white reference value is numeric data based on voltage value output from respective elements of the CCD 3e in the case where the white reference board 37 is scanned with the LED 3b turned on. The white reference value is stored in the white reference value memory 23a. The black reference value is numeric data based on voltage value output from respective elements of the CCD 3e in the case where the white reference board 37 is scanned with the LED 3b turned off. The black reference value is stored in the black reference value memory 23b. When the white reference board 37 is scanned, various data corrections are not executed but the scanned values are directly converted into 16-bit numeric data respectively and stored in the white reference value memory 23a and black reference value memory 23b.

The pixel value set based on the white and black reference values will be described. After a target document is scanned by the scanner 3, the ASIC 3f compares the numeric data corresponding to the voltage value output from each element of the CCD 3e with white and black reference values corresponding to each element. The numeric data output from each element is within the range to the white reference value (maximum value) from black reference value (minimum value). Depending on to which position in the range the numeric data corresponds, the corresponding pixel value is determined. More specifically, the pixel value is represented by 16 bits, and is determined by setting the white reference value to the maximum pixel value (65,536: decimal number) and black reference value to the minimum pixel value (0) and linearly setting the numeric data to the pixel value between 0 to 65,536.

Next, as shown in FIG. 5, a white reference threshold value and a black reference threshold value stored in the threshold value memory 24b will be described. FIG. 5 is an example of white and black reference threshold values which are 16-bit numeric data stored in the threshold value memory 24b. The white reference threshold value is used for determining whether the white reference value stored in the white reference value memory 23a is abnormal or not, and the value thereof is 35,000 (decimal number). Similarly, the black reference threshold value is used for determining whether the black reference value stored in the black reference value memory 23b is abnormal or not, and the value thereof is 500.

If the average value of the white reference values of the respective elements stored in the white reference value memory 23a is smaller than the white reference threshold value, the white reference value is determined to be abnormal. If the average value of the black reference values of the respective elements stored in the black reference value memory 23b is greater than the black reference threshold value, the black reference value is determined to be abnormal. As for the cause of making the white reference value or black reference value abnormal, there can be considered that the scanner 3 is used with the document cover opened and, therefore, the CCD 3e or white reference plate 37 is affected by outside light. When the white reference value or black reference value is abnormal, a plurality of white and black reference values shown in FIG. 6 are used as reference value for setting the pixel value.

Next, with reference to FIG. 6, the plurality of white and black reference values stored in the time dependent reference value memory 24c will be described. FIG. 6 shows an example of, the plurality of white and black reference values stored in the time dependent reference value memory 24c. The plurality of white and black reference values corresponding respectively to a plurality of values of the page counter is stored in the time dependent reference value memory 24c. The plurality of white and black reference values in the time dependent reference value memory 24c are used as alternative reference values in ASIC 3f for setting the pixel value when the white reference value stored in the white reference value memory 23a or black reference value stored in the black reference value memory 23b is abnormal.

The white reference board 37, CCD 3e, and LED 3b of the scanner 3 change in characteristics with time. Thus, if only one fixed alternative reference value is always used to set the pixel value when the white reference value or black reference value output form the CCD 3e becomes abnormal due to temporal change, an accurate image data cannot be obtained. Therefore, in order not to change the image data output from the scanner 3 with time when the reference value becomes abnormal due to influence of outside light, a plurality of white and black reference values in accordance with temporal change are previously stored.

In general, the output voltage of the CCD 3e is decreased in accordance with degradation of the light-receiving sensitivity due to aging and amount of the irradiation light of the LED 3b is decreased due to aging. Thus, in order to make a white reference value corresponding to aging, the plurality of white reference values in the time dependent reference value memory 24c are gradually reduced in accordance with the value of the page counter. On the other hand, 0 is always set for the black reference value in the time dependent reference value memory 24c since the minimum value is always preferable.

If the average value of the white reference values stored in the white reference value memory 23a or average value of the black reference values stored in the black reference value memory 23b is abnormal, the value of the page counter stored in the time count memory 24a is referred to and, one white reference value in the time dependent reference value memory 24c is stored in the white reference value memory 23a as new reference value based on the referred value of the page counter. Similarly, one black reference value in the time dependent reference value memory 24c is stored in the black reference value memory 23b as a new reference value based on the referred value of the page counter. Thus, even if the white and black reference values become abnormal due to influence of outside light, an image on a document can accurately be scanned without influence of the temporal change of the scanner 3.

At this time, the same white reference value is set for respective elements of the CCD 3e and stored in the white reference value memory 23a. Similarly, the same black reference value is set for respective elements of the CCD 3e and stored in the black reference value memory 23b. Accordingly, the same white reference value and same black reference value are used as reference value for setting the pixel value in the ASIC 3f in all the elements of the CCD 3e.

Next, processing executed by the CPU 21 of the MFP 1 will be described with reference to FIG. 7. FIG. 7 is a flowchart showing processing executed upon depression of the document scanning button which is one of the operation keys 40.

First, the CPU 21 turns on the LED 3b of the scanner 3 in S1 and instructs the image reading unit 3a to scan the white reference board 37 for setting the white reference value in S2. The image reading unit 3a scans the white reference board 37 in a state where the LED 3b is turned on, and voltage values are output from the respective elements of the CCD 3e. Each of the voltage values is converted into 16-bit numeric data by ASIC 3f and stored in the white reference value memory 23a as a white reference value corresponding to each element.

Upon detecting that the white reference values have been stored in the white reference value memory 23a by the ASIC 3f, the CPU 21 reads out the white reference values corresponding to the respective elements from the white reference value memory 23a and calculates the average value thereof. Then, in S3 the CPU 21 determines whether the average value of the white reference values of the respective elements is normal or not. If the average value of the white reference values is smaller than the white reference threshold value stored in the threshold value memory 24b, the CPU 21 determines the white reference values are abnormal (S3: NO). However, if the average value of the white reference values is not smaller than the white reference threshold value stored in the threshold value memory 24b, the CPU determines that the white reference values are normal (S3: YES).

If the average value of the white reference values is normal (S3: YES), the CPU 21 turns off the LED 3b in S4 and instructs the image reading unit 3a to read the white reference board 37 for setting the black reference value in S5. The image reading unit 3a reads the white reference board 37 in a state where the LED 3b is turned off, and voltage values are output from the respective elements of the CCD 3e. Each of the voltage values is converted into 16-bit numeric data by ASIC 3f and stored in the black reference value memory 23b as a black reference value corresponding to each element.

Upon detecting that the black reference values have been stored in the black reference value memory 23b by the ASIC 3f, the CPU 21 reads out the black reference values corresponding to the respective elements from the black reference value memory 23b and calculates the average value thereof. Then, in S6 the CPU 21 determines whether the average value of the black reference values of the respective elements is normal or not. If the average value of the black reference values is greater than the black reference threshold value stored in the threshold value memory 24b, the CPU 21 determines the black reference values are abnormal (S6: NO).

However, if the average value of the black reference values is not greater than the black reference threshold value stored in the threshold value memory 24b, the CPU 21 determines that the black reference values are normal (S6: YES) and advances to S8.

On the other hand, if the CPU 21 determines that the white reference values are abnormal (S3: NO), or that the black reference values are abnormal (S6: NO), the CPU 21 refers the value of the page counter stored in the count memory 24a. In S7 the CPU 21 reads out one white reference value and one black reference value from the time dependent reference value memory 24c based on the counter value of the page counter and stores the one white reference value and the one black reference value in the white reference value memory 23a and black reference value memory 23b as a new reference value. Then, the CPU 21 advances to S8 and instructs the image reading unit 3a to scan a document, When the image reading unit 3a scans the document by one line, voltage values output from the respective elements of the CCD 3e are each converted into 16-bit numeric data by the ASIC 3f. The numeric data of the voltage value output from the respective elements of the CCD 3e is each within a range to the white reference value (maximum value) from the black reference value (minimum value), and the ASIC 3a determines each pixel value based on the relative position of the numeric data with respect to the range. After completion of the setting of the pixel values in all the elements of the CCD 3e, the next line of the document is scanned. Following the entire document has been scanned, image data is output from the ASIC 3f. The image data is then stored in the image memory 23c of the RAM 23 through the bus line 25

In S9 the CPU 21 determines whether the entire document has been scanned. If determining that the entire document has been read (S9: YES), the CPU ends the processing. However, if determining that the entire document has not been scanned (S9: NO), the CPU 21 returns to S8 and instructs the image reading unit 3a to scan the document.

Although the present invention has been described with reference to the preferred embodiment, the present invention is not limited to the above embodiment and, evidently, a variety of modifications and changes may be made without departing from the scope of the present invention.

For example, in the above embodiment, the number of sheets, which is used in the printer 2 since the MFP 1 was produced, is stored in the count memory 24a. However, a timer circuit may be provided in the MFP 1 so as to store a total operating time during which the image reading unit 3a (the scanner 3) has been operated since the MFP 1 was produced in the count memory 24a and store a plurality of reference times based on the operating time in the time dependent reference value memory 24c. In this case, if the white reference value stored in the white reference value memory 23a or black reference value stored in the black reference value memory 23b is abnormal, the white and black reference values are set in accordance with the total operating time in the count memory 24a. With this configuration, even if the white and black reference values become abnormal due to influence of outside light, an image on a document can accurately be scanned without influence of the temporal change of the scanner 3.

Further, in the above embodiment, the number of sheets, which is used in the printer 2 since the MFP 1 was produced, is stored in the count memory 24a. However, the number of documents that have been scanned by the scanner 3 may be stored in the count memory 24a and a plurality of reference values based on the number of documents that have been scanned may be stored in the time dependent reference value memory 24c. In this case, if the white reference value stored in the white reference value memory 23a or black reference value stored in the black reference value memory 23b is abnormal, the white and black reference values are set in accordance with the number of scanned documents in the count memory 24a. With this configuration, even if the white and black reference values become abnormal due to influence of outside light, an image on a document can accurately be scanned without influence of the temporal change of the scanner 3.

Further, in the above embodiment, the plurality of the white and black reference values is stored in the time dependent reference value memory 24c. If the white and black reference values that have been scanned by the scanner 3 are abnormal, one white reference value and one black reference value based on the value in the count memory 24a are read out from the plurality of the white and black reference values. However, calculation expression for calculating the reference value from the value in the count memory 24a may be stored in the flash memory 21. Then, if the reference values that have been scanned by the scanner 3 are abnormal, the value in the count memory 24a may be assigned to the calculation expression so as to calculate the reference value.

Further, in the above embodiment, if the white and black reference values scanned by the scanner 3 become abnormal due to influence of outside light, one white reference value and one black reference value based on the value in the count memory 24a is read out from the time dependent reference value memory 24c and the one white reference value and one black reference value are stored in the white reference value memory 23a and black reference value memory 23b respectively by the number corresponding to the number of elements. That is, the number, corresponding to the number of the elements, of the white and black reference value is stored. However, if the reference value is abnormal and pixel value is set by the ASIC 3f, one white reference value and one black reference value may be stored in the white reference value memory 23a and black reference value memory 23b respectively for only one element so as to allow the residual memory region to be used for other functions or programs. That is, only one white reference value and only one black reference value may be stored.

What is claimed is:

1. An image reading device comprising:
   a reference member;
   a reading unit that scans an image on a document to obtain image data and that scans the reference member to obtain reference data;
   a first reference value setting unit that sets a first reference value based on the reference data;
   a detecting unit that detects a usage state of the reading unit;
   a second reference value setting unit that sets a second reference value in accordance with the usage state of the reading unit;
   a determining unit that determines whether or not the first reference value is in a predetermined condition;
   a pixel value setting unit that sets a pixel value, the pixel value setting unit setting the pixel value based on the image data and on the first reference value, if the determining unit determines that the first reference value is in the predetermined condition; and the pixel value setting unit setting the pixel value based on the image data and on the second reference value, if the determining unit determines that the first reference value is not in the predetermined condition; and
   a light source that irradiates light on the reference member, wherein the reading unit scans the reference member while the light source is turned on to irradiate light on the reference member, thereby obtaining white reference data, and scans the reference member while the light source is turned off, thereby obtaining black reference data, wherein the first reference value setting unit sets a first white reference value based on the white reference data, and sets a first black reference value based on the black reference data, wherein the second reference value setting unit sets a second white reference value and a second black reference value, wherein the determining unit determines whether or not the first white reference value is in a predetermined white condition, and determines whether or not the first black reference value is in a predetermined black condition, and wherein if the determining unit determines that the first white reference value is in the predetermined white condition and the first black reference value is in the predetermined black condition, the pixel value setting unit sets the pixel value based on the image data, on the first white reference value and on the first black reference value; if the determining unit determines that the first white reference value is not in the predetermined white condition, the pixel value setting unit sets the pixel value based on the image data, on the second white reference value and on the second black reference value; and if the determining unit determines that the first black reference value is not in the predetermined black condition, the pixel value setting unit sets the pixel value based on the image data, on the second white reference value and on the second black reference value.

2. The image reading device according to claim 1, further comprising a memory that stores a plurality of different usage states of the reading unit and a plurality of second reference values in one to one correspondence with the plurality of different usage states, wherein the second reference value setting unit selects a second reference value from among the plurality of second reference values in accordance with the usage state of the reading unit.

3. The image reading device according to claim 1, further comprising a memory that stores a white threshold value and a black threshold value, wherein the determining unit determines whether the first white reference value is in the predetermined white condition by comparing the first white reference value with the white threshold value and determines whether the first black reference value is in the predetermined black condition by comparing the first black reference value with the black threshold value.

4. The image reading device according to claim 1, wherein the detecting unit detects, as the usage state, a length of a total operating time during which the reading unit has been operated since the reading unit was produced.

5. The image reading device according to claim 1, further comprising a printing unit that prints an image on a recording medium based on the pixel value set by the pixel value setting unit, wherein the detecting unit detects, as the usage state, the number of the recording medium printed by the printing unit.

6. The image reading device according to claim 1, wherein the detecting unit detects, as the usage state, the number of the document scanned by the reading unit.

7. The image reading device according to claim 1, further comprising a memory that stores a threshold value, and the determining unit determines whether the first reference value is in the predetermined condition by comparing the first reference value with the threshold value.

8. An image reading method for an image reading device including a reference member, comprising:

scanning, using a reading unit, an image on a document to obtain image data;

scanning, using the reading unit, the reference member to obtain reference data;

setting a first reference value based on the reference data;

detecting, using a CPU, a usage state of the reading unit;

setting a second reference value in accordance with the usage state of the reading unit;

determining, using the CPU, whether or not the first reference value is in a predetermined condition;

setting a pixel value based on the image data and on the first reference value, if the first reference value is in the predetermined condition;

setting the pixel value based on the image data and on the second reference value, if the first reference value is not in the predetermined condition;

irradiating, using a light source, light on the reference member;

scanning the reference member while the light source is turned on to irradiate light on the reference member, thereby obtaining white reference data, and scanning the reference member while the light source is turned off, thereby obtaining black reference data;

setting a first white reference value based on the white reference data, and setting a first black reference value based on the black reference data;

setting a second white reference value and a second black reference value;

determining whether or not the first white reference value is in a predetermined white condition, and determining whether or not the first black reference value is in a predetermined black condition;

when the first white reference value is in the predetermined white condition and the first black reference value is in the predetermined black condition, setting the pixel value based on the image data, on the first white reference value and on the first black reference value;

when the first white reference value is not in the predetermined white condition, setting the pixel value based on the image data, on the second white reference value and on the second black reference value; and when the first black reference value is not in the predetermined black condition, setting the pixel value based on the image data, on the second white reference value and on the second black reference value.

* * * * *